(12) United States Patent
Petrillo et al.

(10) Patent No.: US 7,518,102 B2
(45) Date of Patent: Apr. 14, 2009

(54) CALIBRATION METHOD AND APPARATUS FOR PIXILATED SOLID STATE DETECTOR

(75) Inventors: Michael J. Petrillo, Cleveland, OH (US); Jingjan Ye, Cleveland, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 42 days.

(21) Appl. No.: 10/595,465

(22) PCT Filed: Oct. 6, 2004

(86) PCT No.: PCT/IB2004/052003

§ 371 (c)(1),
(2), (4) Date: Apr. 21, 2006

(87) PCT Pub. No.: WO2005/040855

PCT Pub. Date: May 6, 2005

(65) Prior Publication Data

US 2007/0145257 A1    Jun. 28, 2007

Related U.S. Application Data

(60) Provisional application No. 60/515,099, filed on Oct. 27, 2003.

(51) Int. Cl.
*G01D 18/00* (2006.01)
(52) U.S. Cl. .................................. 250/252.1; 378/207
(58) Field of Classification Search .............. 250/252.1; 378/207
See application file for complete search history.

(56) References Cited

U.S. PATENT DOCUMENTS

| | | | | |
|---|---|---|---|---|
| 4,280,047 A * | 7/1981 | Enos | ................ | 250/252.1 |
| 4,499,375 A * | 2/1985 | Jaszczak | ............. | 250/252.1 |
| 4,789,930 A * | 12/1988 | Sones et al. | ............. | 378/207 |
| 5,502,303 A * | 3/1996 | Gonzalez-Lepera | ...... | 250/252.1 |
| 5,512,754 A * | 4/1996 | Enos | ................ | 250/363.1 |
| 5,633,499 A | 5/1997 | Lim et al. | | |
| 6,362,472 B1 | 3/2002 | Yarnall et al. | | |
| 6,409,383 B1 | 6/2002 | Wang et al. | | |
| 6,559,450 B1 | 5/2003 | Berlad et al. | | |
| 6,694,172 B1 | 2/2004 | Gagnon et al. | | |
| 2002/0063204 A1 | 5/2002 | Yarnall et al. | | |
| 2002/0080912 A1* | 6/2002 | Mackie et al. | ............. | 378/21 |

FOREIGN PATENT DOCUMENTS

| GB | 997338 | 7/1965 |
|---|---|---|
| GB | 1382780 | 2/1975 |

* cited by examiner

*Primary Examiner*—David P Porta
*Assistant Examiner*—Jessica L Eley

(57) ABSTRACT

A system calibrates a solid state detector (20) for a radiation imaging device (10) in a single acquisition. A calibration phantom (40) emits radiation concurrently at at least first and second characteristic energy levels. A nuclear camera (16) generates associated sets of radiation data spanning both the first and second energy levels from the emitted radiation that is received by solid state detector (20). A means (64) determines associated centers of energy peaks and energy values of the generated data sets. A calibration means (80) calibrates at least one of gain, offset, performance and dead pixel correction based on the determined centers and peaks of the acquired data sets.

22 Claims, 4 Drawing Sheets

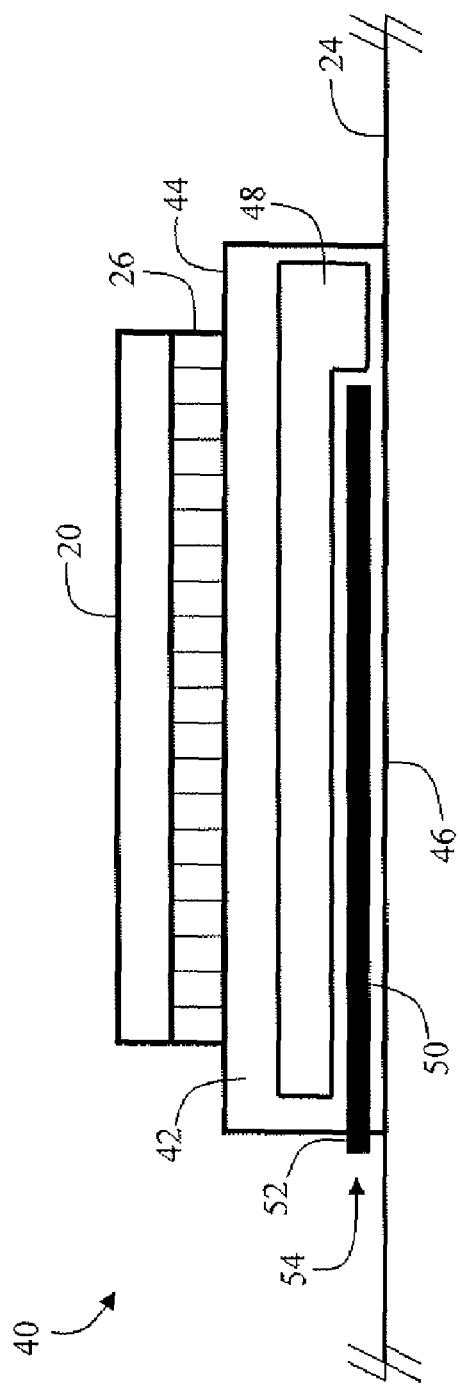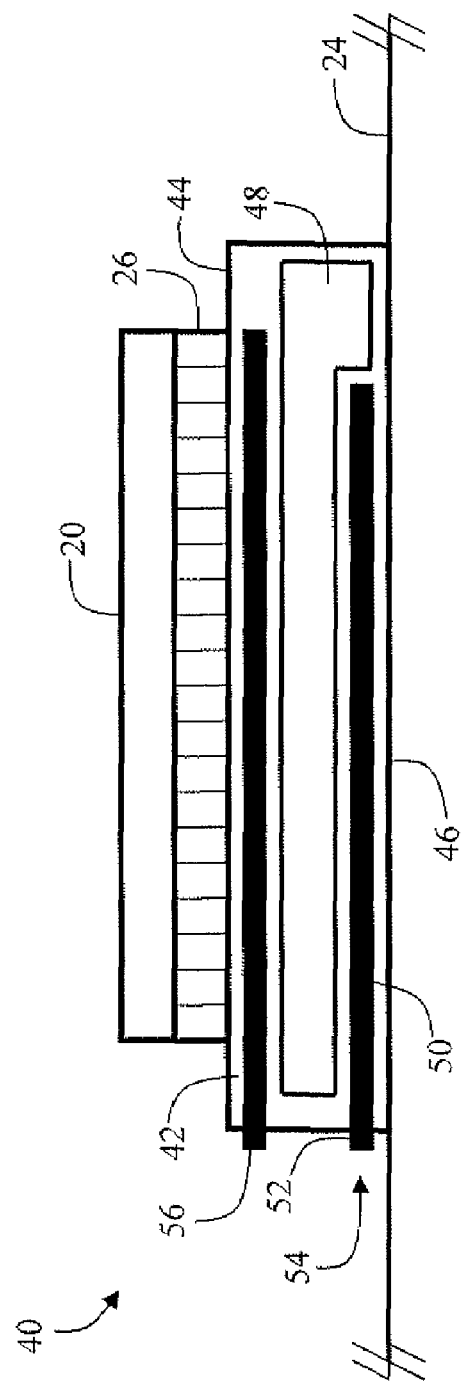
FIG. 2A
FIG. 2B

CALIBRATION METHOD AND APPARATUS FOR PIXILATED SOLID STATE DETECTOR

CROSS REFERENCE TO RELATED APPLICATIONS

This application claims the benefit of U.S. provisional application Ser. No. 60/515,099 filed Oct. 27, 2003, which is incorporated herein by reference.

The present invention relates to the diagnostic imaging systems and methods. It finds particular application in conjunction with the nuclear imaging systems using solid state detectors (SSD) and will be described with particular reference thereto. It will be appreciated that the invention is also applicable to the other imaging systems using other pixilated imaging devices, and the like.

Diagnostic nuclear imaging is used to study a radionuclide distribution in a subject. Common use radiopharmaceuticals incorporate a variety of short lives radioisotopes. Each isotope has a characteristic energy, usually in the range of about 50-500 keV. Typically, one or more radiopharmaceuticals or radioisotopes, appropriate to the imaging examination, are selected and injected into the subject's bloodstream. Typical applications include imaging the circulatory system or imaging specific organs, which absorb the injected radiopharmaceutical. A radiation detector is placed adjacent to the surface of the subject to monitor and record emitted radiation. Often, the detector is rotated or indexed around the subject to monitor the emitted radiation from a plurality of directions. These projection data sets are reconstructed into a three-dimensional image representative of the radiopharmaceutical distribution within the subject.

Historically, each detector head included an array of photomultiplier tubes (PMTs) facing a large scintillation crystal. Each radiation event generated a corresponding flash of light that was being seen by the closest photomultiplier tubes. Each photomultiplier tube that saw an event put out a corresponding analog pulse. The analog pulses from the individual PMT's were digitized and combined to generate x and y spatial coordinates of the location of scintillation event on the crystal face.

In recent years, solid state detectors have been introduced in nuclear cameras. Solid state detectors utilize the photoelectric effect to detect radiation. More specifically, the received radiation photons liberate electrons from their orbits around atoms of the target material. The electrons are detected as an electrical signal.

Solid state detector based nuclear camera calibration is typically performed for gain and offset of each pixel to correct inconsistencies with pixel charge collection, signal bias and impurities that interfere with charge generation in the pixels of the solid state detector. In addition, calibration might be required in regards to the dead pixel recovery and uniformity of amount of counts acquired within the acquisition window. For linearity over the radioisotope energy range, two calibrations are performed. A uniform sheet of a first isotope material, such as cobalt with an energy peak at 122 kEv, is placed in front of the detector and the radiation is detected for about an hour. Because the radiation source is uniform, all detectors should have the same response. Then, the first sheet is removed and the process is repeated for another hour with a uniform layer of a second isotope with a different characteristic energy, e.g. Americium with a 60 keV peak. Based on the response of each detector at two offset energies, a calibration adjustment which is interpolated and extrapolated to be linear over the full range of common isotope energies is determined. In multi-head nuclear cameras, this process is repeated for each head. Although effective, the calibration process is time consuming.

There is a need for a technique that will perform the calibration more quickly and efficiently. The present invention provides a new imaging apparatus and method which overcomes the above-referenced problems and others.

In accordance with one aspect of the present invention, a system for calibrating a solid state detector for a radiation imaging device in a single acquisition is disclosed. A means emits radiation concurrently at at least first and second preselected energy levels. A means generates associated sets of radiation data spanning both the first and second energy levels from the emitted radiation that is received by solid state detector. A means determines associated centers of energy peaks and energy values. A means calibrates at least one of gain, offset, performance and dead pixel correction based on the determined centers and peak of the acquired data sets.

In accordance with another aspect of the present invention, a method of calibrating a solid state detector in a nuclear imaging system is disclosed. Radiation is emitted concurrently at at least first and second preselected energy levels. Associated sets of radiation data from the emitted radiation received by the detector are generated. Centers of energy peaks and energy values for the generated data sets are determined. At least one of gain, offset, performance and dead pixel correction based on the determined centers and peaks of the acquired data sets is calibrated.

One advantage of the present invention resides in expediting calibration by shortening the calibration times.

Another advantage of the present invention resides in performing calibration for pixel gain and offset, uniformity, and dead pixel correction in a single acquisition thus providing more consistent calibration method.

Another advantage of the present invention resides in performing calibration for pixel gain and offset, uniformity, and dead pixel correction using only one isotope.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

FIG. 2A is a detailed diagrammatic illustration of a first calibration phantom adjacent detector head;

FIG. 2B is a detailed diagrammatic illustration of a second calibration phantom;

Figure 1:
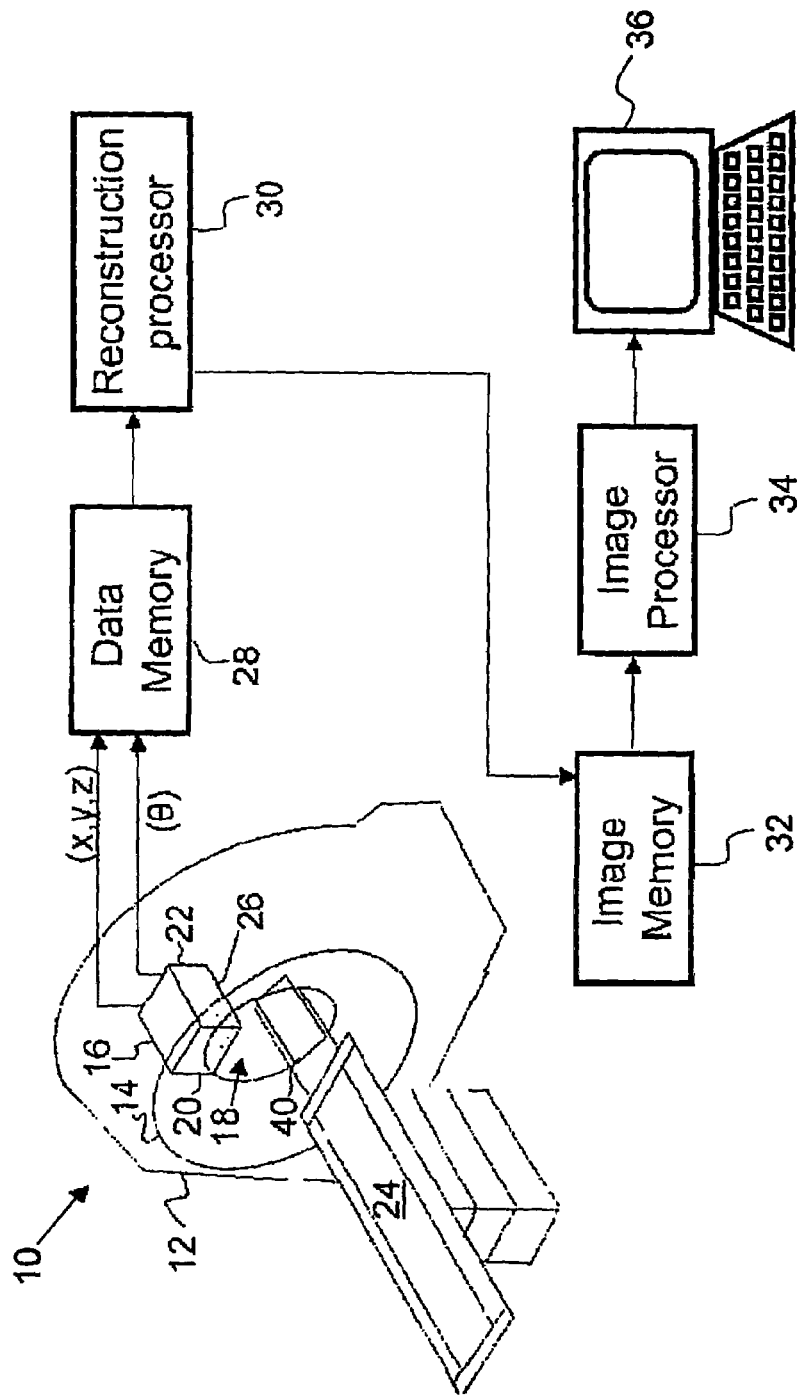
FIG. 1 is a diagrammatic illustration of a nuclear imaging system.

With reference to FIG. 1, a nuclear imaging device 10 typically includes a stationary gantry 12 that supports a rotating gantry 14. One or more detector heads 16 are carried by the rotating gantry 14 to detect radiation events emanating from a region of interest or examination region 18. Each detector head 16 includes a two-dimensional array 20 of detector elements. The detector arrays are preferably solid-state detectors, which convert gamma radiation directly into electrical charge. Each head 16 includes circuitry 22 for converting each radiation response into a digital signal indicative of its location (x, y) on the detector face and its energy (z).

Typically, an object to be imaged is injected with one or more radiopharmaceuticals or radioisotopes and placed in the examination region 18 supported by a couch 24. The presence of the pharmaceuticals within the object produces emission radiation from the object. Radiation traveling along a trajectory defined by a collimator 26 is detected by each detector head 16. The detector heads 16 are angularly indexed or rotated around the examination region 18 to collect the emission data from a plurality of directions. During diagnostic imaging, the projection emission data (x, y, z) and an angular position (θ) of the detector head around the examination region are stored in a data storage 28. A reconstruction processor 30 processes the event and detector orientation data from the data storage 28 into a volumetric image representation. The image representation is then stored at a volume image memory 32 for manipulation by a video processor 34 and display on an image display 36 such as a video monitor, printer, or the like.

With continuing reference to FIG. 1 and further reference to FIG. 2A, a calibration phantom 40 is positioned and supported on the couch 24 in front of the detector head 16 to be imaged by the nuclear imaging device 10. Typically, the phantom has a horizontal size that corresponds to the size of the radiation receiving face of the detector head. The detector head to be calibrated is positioned at 12 o'clock to face the phantom 40 square on. The couch 24 is raised and, if possible, the detector head is lowered to bring the detector head and the phantom into close proximity. To obtain an accurate calibration, the phantom 40 emits radiation at at least two energy levels concurrently. The phantom 40 includes a tank 42 positioned in front of the collimator 26. The tank 42 includes a front side 44, which is positioned facing the collimator 26 of the detector head, and a back side 46, opposing the front side 44 and lying on the couch 24. The tank 42 includes a first radiation source 48, which is, preferably, a liquid solution Technetium (Tc) that is dispersed into the tank 42. Technetium provides a first energy level, with a first peak centered at about 140 keV. Technetium is a common radiopharmaceutical isotope and calibrating to it specifically improves the correlation. However, other isotopes might be used as well. Examples of such isotopes are Gallium (Ga) and Germanium (Ge) with corresponding energy peaks at about 500 keV and 660 keV.

A second source of radiation 50 with a different emission peak, such as removable lead (Pb) sheet or back sheet or back layer 52, is positioned about the back side 46 of the tank 42. The back sheet 52 might be inserted into a slot 54 provided in the tank 42. The lead provides radiation with a second energy peak centered at about 70 keV. More particularly, the second radiation is generated as backscattered emission radiation. When radiation from the first radiation source 48 collides with the solid lead sheet 52, it causes secondary emission. Of course, other materials, such as tin and copper, are also contemplated to provide a source of secondary radiation.

In one alternate embodiment, the first radiation source 48 includes an isotope, such as Cobalt (Co), having two energy levels with the first energy peak at about 130 keV and the second energy peak at about 122 keV. In addition to the first and second energy peaks provided by Cobalt, a lead or other sheet at the back of the phantom 40 can provide a radiation source 50 with a third energy peak for more accurate calibration.

In general, calibration accuracy is improved by having more points along the calibration curve, particularly points which span the operating energy region.

In another embodiment, the first radiation source 48 is a liquid mixture or stacked of isotopes, concurrently emitting radiation at two or more energy levels. Optionally, the second radiation source 50 is a sheet that is attached to the phantom 40 to provide another energy level by secondary emission.

With reference to FIG. 2B, an additional radiation source or front sheet or front layer 56 is attached to the front side 44 of the first radiation source 48. The front sheet 56 is positioned directly in front of the collimator 26 for providing an increased secondary radiation flux. Preferably, the front layer is very thin, such as an electroplated or foil layer which is adhered to the front face of the tank 42. The front layer 56 can be the same metal as the back layer 52 to provide more radiation at the second energy peak. Alternatively, a different metal which produces secondary radiation at yet another energy peak can be used.

Figure 3:
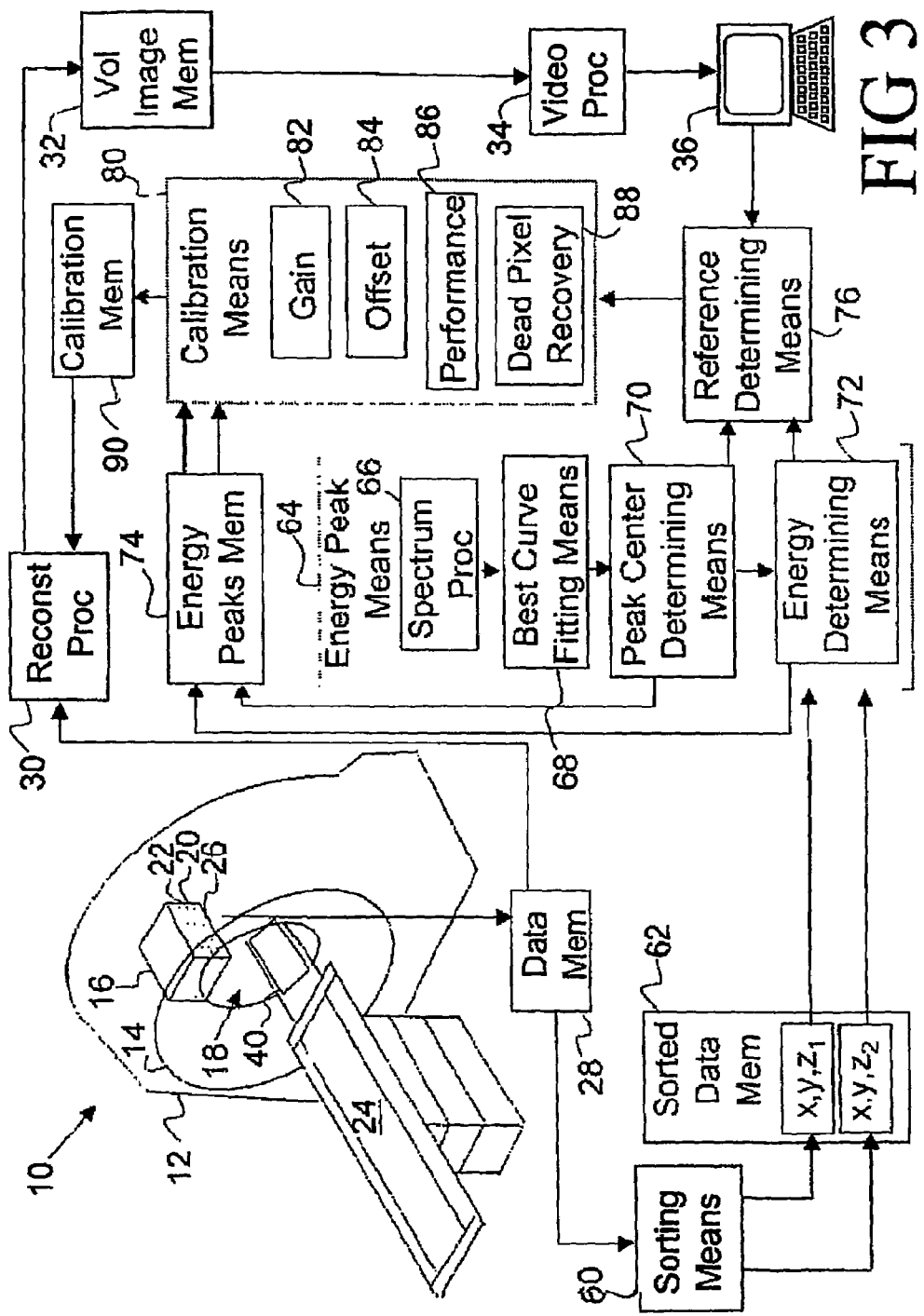
FIG. 3 is a diagrammatic illustration of a calibration system in accordance with the present invention.
Figure 4:
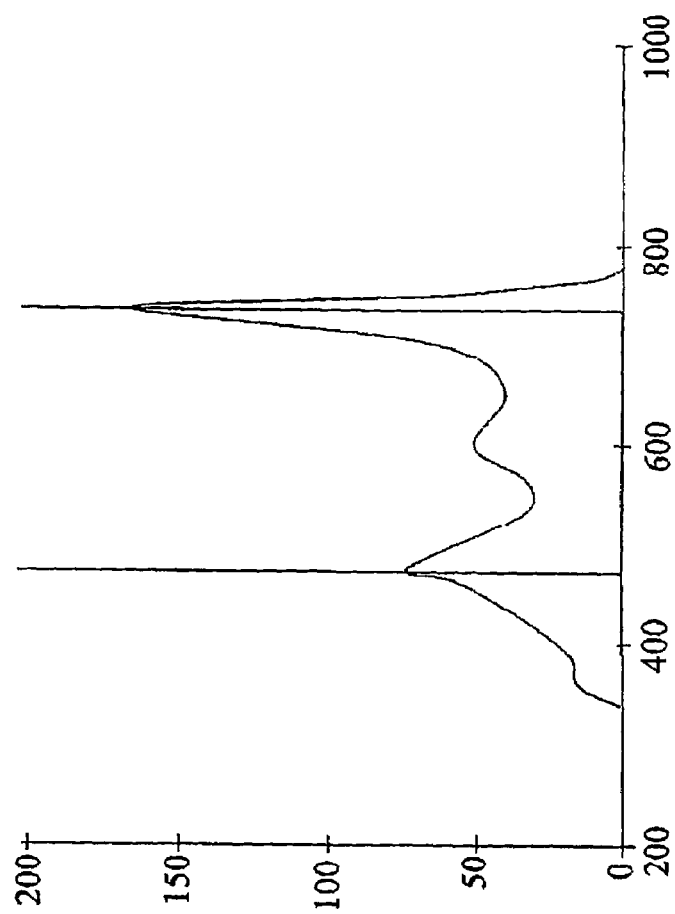
FIG. 4 is a curve illustrating received photon counts versus energy.

With reference again to FIG. 1 and further reference to FIG. 3, the phantom 40 emits radiation at two or more energy levels or peaks. The data, indicative of radiation intensity produced by a first radiation source and a second radiation source for each pixel or detector element with coordinates $(x_i, y_j)$, is collected into the data memory 28. The data is thresholded or sorted by a sorting means 60 to distinguish between the data contributed by the first and second energy peaks. The sorted data is stored in a sorted data memory 62. An energy peak means 64 finds the first and second energy peaks which correspond to the first and second radiation sources that have known energy levels. Specifically, a spectrum processor 66 processes each detector element's output to determine the energy of each photon and find the distribution of the radiation intensity. The distribution can be expressed as a curve of number of received photons counts vise energy. Such curve looks as a flat line with two Gaussian peaks—each centered on the energy peak for each radiation source, as shown in FIG. 4. A best curve fitting means 68 uses a best curve fitting technique to determine the first and second measured energy peaks. Preferably, the best curve fitting means 68 uses Gaussian curve fitting function:

$$f(x) = Ce^{-\frac{x-x_0}{2\sigma^2}},$$

where the parameters to be found are peak center $x_0$, height of an energy peak C and width of the energy peak σ.

A peak center determining means 70 finds the center positions $C_1$ and $C_2$ of the first and second measured energy peaks. An energy determining means 72 finds the values of energy $E_1$ and $E_2$ at the center positions of both peaks. The peak center positions and the energy values are stored in an energy peaks memory 74. A reference point determining means 76 calculates a gain and offset reference points such that the output curve of each detector element is aligned to a common reference, i.e. all the same center energy and peak amplitude. Optionally, gain and offset reference points are values entered by an operator.

A calibration means 80 retrieves the information from the reference point determining means 76 and the energy peaks memory 74 to determine calibration parameters for each element of the detector array 20. More particularly, a gain calibration means 82 calculates gain as $$g = \frac{E_2 - E_1}{C_2 - C_1},$$

where $C_1$ and $C_2$ are centers of the curves and $E_1$ and $E_2$ are corresponding peak energy values.

An offset calibration means 84 calculates offset as $$C_0 = C_1 - \frac{E_1}{g},$$

where $C_1$ is the center of the curves and $E_l$ is the corresponding energy value.

A performance means 86 looks at the each detector element data and compares it with predetermined performance measures to determine how efficient the detector is and how good the pixels energy resolution is. For example, it determines if any measured peak is too low or too wide relative to other detector elements. The performance means 86 uses a totality of performance parameters to perform additional calibration such as the correction of uniformity of the response of the detector.

A dead pixel recovery processor 88 monitors the information about each pixel to determine if each has substantially the same number of counts and substantially the same energy distribution. If any of the detector elements differ from others by more than a preselected deviation, the dead pixel recovery processor disconnects the malfunctioning elements from the circuitry 22. The dead pixel recovery processor 88 creates a look up table, in which the outputs of neighboring detector elements are interpolated to fill in the dead pixel area.

The invention has been described with reference to the preferred embodiments. Modifications and alterations may occur to others upon a reading and understanding of the preceding detailed description. It is intended that the invention be constructed as including all such modifications and alterations insofar as they come within the scope of the appended claims or the equivalents thereof.

The invention claimed is:

1. A system for calibrating a solid state detector for a radiation imaging device in a single acquisition, the system comprising:
    a means for emitting radiation concurrently of at least first and second preselected energy levels, the means for emitting radiation being located in an imaging region of a nuclear imagine device;
    a means for generating associated sets of radiation data spanning both the first and second energy levels from the emitted radiation that is received by solid state detector;
    a means for determining associated centers of energy peaks and energy values of the generated data sets; and
    a means for calibrating at least one of gain, offset, performance and dead pixel correction based on the determined centers and peaks of the acquired data sets.

2. The system as set forth in claim 1, wherein the radiation emitting means includes:
    a tank, which holds a radioisotope which emits radiation at the first energy level; and
    a means which receives radiation of the first energy level and emits radiation at the second energy level.

3. The system as set forth in claim 2, wherein the radioisotope in is a liquid solution.

4. The system as set forth in claim 3, wherein the means, which emits radiation at the second energy level, includes:
    a dense metal sheet disposed along a rear side of the tank opposite the solid state detector, the dense metal sheet emitting the second energy level radiation by secondary emission.

5. The system as set forth in claim 4, further including a second metal sheet disposed along a front side of the tank between the radioisotope and the solid state detector, the second metal sheet receiving radiation of the first energy level and emitting radiation of another energy level.

6. The system as set forth in claim 5, wherein the dense and second metal sheets include lead and emit secondary radiation at 70 keV.

7. The system as set forth in claim 1, wherein the radiation emitting means includes a single dual peak isotope which emits radiation at both the first and the second energy levels concurrently.

8. The system as set forth in claim 7, further including:
    a source of a secondary radiation, which converts some of the radiation emitted by the dual peak isotope to a characteristic energy level.

9. The system as set forth in claim 1, wherein the radiation emitting means includes a mixture of isotopes, each isotope emitting radiation at at least one energy level.

10. The system as set forth in claim 9, further including:
    a source of a secondary radiation which receives radiation from the isotope mixture and emits radiation at a characteristic energy level lower than the energy levels of at least some of the radiation emitted by the isotope mixture.

11. The system as set forth in claim 1, wherein the solid state detector includes an array of detector elements that convert gamma radiation directly into electrical charge and the generating means generates a set of radiation data for each detector element.

12. A method of calibrating a solid state detector in a nuclear imaging system comprising:
    concurrently emitting radiation at at least first and second preselected energy levels from within an imaging region of the nuclear imaging system;
    generating associated sets of radiation data from the emitted radiation received by the detector;
    determining centers of energy peaks and energy values for the generated data sets; and
    calibrating at least one of gain, offset, performance and dead pixel correction based on the determined centers and peaks of the acquired data sets.

13. The method as set forth in claim 12, wherein the generating step includes:
    detecting the emitted radiation with a solid state detector that converts radiation into electrical charge; and
    generating the sets of radiation data from the electrical charge.

14. A calibration phantom configured to be disposed in an imaging region of a nuclear imaging system for calibrating a pixilated solid state detector, the phantom comprising:
    a radioisotope layer which emits radiation of a first characteristic energy; and
    a metal layer disposed parallel to the radioisotope layer to receive the radiation of the first characteristic energy from the radioisotope layer and emit radiation of a second characteristic energy by a secondary emission.

15. The calibration phantom as set forth in claim 14, wherein the radioisotope layer includes a radioisotope in liquid solution.

16. The calibration phantom as set forth in claim 15, wherein the liquid solution includes a plurality of radioisotopes each having a characteristic energy.

17. The calibration phantom as set forth in claim 15, wherein the radioisotope includes a radioactive isotope of at least one of Technetium, Gallium, Americium, Cobalt, and Germanium.

18. The calibration phantom as set forth in claim 14, wherein the metal layer is one of Lead, Copper, Molybdenum, Tungsten, and Tin.

19. The calibration phantom as set forth in claim 14, wherein the radioisotope has a dual energy peak.

20. In combination, the phantom of claim 14 and a pixilated nuclear camera, and further including:
- a pixel energy peak analyzer which finds energy peaks generated about the first and second characteristic energies for each pixel of the pixilated nuclear camera; and
- a calibration processor which utilizes the energy peaks information to at least one of correct each pixel's gain and offset, regulate the nuclear camera's overall performance, and recover dead pixels areas.

21. An energy level calibration phantom configured to be disposed in an imaging region of a nuclear imaging system for calibrating a solid state detector of the nuclear imaging system, the phantom comprising:
- a radioisotope which emits radiation of a first characteristic energy; and
- a layer that receives the radiation of the first characteristic energy from the radioisotope layer and emits radiation of a second characteristic energy by a secondary emission.

22. The phantom as set forth in claim 21, further including:
- a reservoir which holds the radioisotope which emits the radiation of the first characteristic energy;
- the reservoir and the layer which emits the radiation of the second characteristic energy by secondary emission being positioned adjacent in the imaging region such that the solid state detector receives the radiation of the first energy and the radiation of the second energy and generates energy indicative electrical signals which are indicative of the energy of the received radiation in response to the received radiation;
- one or more processors that processes the electrical signals to determine a first energy peak corresponding to the radiation of the first energy and a second energy peak corresponding to the second energy and that calibrates the energy indicative electrical signals of the solid state detector such that signals of the first peak are indicative of the first characteristic energy and signals of the second peak are indicative of the second characteristic energy.

* * * * *